United States Patent [19]
Alden et al.

[11] Patent Number: 5,231,920
[45] Date of Patent: Aug. 3, 1993

[54] CONVEYOR OVEN WITH UNIFORM AIR FLOW

[75] Inventors: Lorne B. Alden, Shelburne; James T. Cole, Essex Junction, both of Vt.

[73] Assignee: G. S. Blodgett Corporation, Burlington, Vt.

[21] Appl. No.: 762,109

[22] Filed: Sep. 19, 1991

[51] Int. Cl.$^5$ ............................................. A21B 1/00
[52] U.S. Cl. .................................. 99/443 C; 99/475; 99/477; 126/21 A; 239/593
[58] Field of Search .................. 99/443 C, 475, 477; 126/21 A; 239/590, 590.5, 590.3, 593

[56] References Cited

U.S. PATENT DOCUMENTS

| | | |
|---|---|---|
| 4,154,861 | 5/1979 | Smith . |
| 4,462,383 | 7/1984 | Henke et al. . |
| 4,556,043 | 12/1985 | Bratton ........................ 99/443 C X |
| 4,718,178 | 1/1988 | Whipple ........................ 239/593 X |
| 4,776,107 | 10/1988 | Buske . |
| 4,873,107 | 10/1989 | Archer ........................ 99/443 C X |
| 4,951,648 | 8/1990 | Shukla et al. ................ 99/443 C |
| 4,960,100 | 10/1990 | Pellicane .................... 126/21 A |
| 4,972,824 | 11/1990 | Luebke et al. ............... 126/21 A |
| 5,025,775 | 6/1991 | Crisp ........................ 126/21 A |

Primary Examiner—Frankie L. Stinson
Attorney, Agent, or Firm—Lowe, Price, LeBlanc & Becker

[57] ABSTRACT

A conveyor oven is described which is compact and suitable for smaller commercial establishments. The device uses mutually spaced nozzles which extend across the upper and lower portion of the cooking chamber which direct heated air currents respectively downwardly and upwardly onto food passing therethrough. Each nozzle is a duct which extends perpendicular to the longitudinal axis of the conveyor and has a foraminous plate on the side adjacent the conveyor for dispensing heated air currents therethrough. The nozzles are fed from a common plenum with heated air under pressure. As the air enters each nozzle, it encounters an angled diverter plate which is disposed at about a 30 degree angle to the longitudinal axis of the nozzle and downstream of the plate a flat stabilizer plate which extends a substantial length of the nozzle terminating about two inches before the end thereof. The plates insure that the flow of heated air through the foraminous plates is uniform along the entire length of the nozzle across the path of travel of the conveyor.

14 Claims, 6 Drawing Sheets

CONVEYOR OVEN WITH UNIFORM AIR FLOW

FIELD OF THE INVENTION

This invention relates to a conveyor oven and in particular to a compact and efficient oven for cooking a wide variety of food items including fast food items such as pizza.

The efficiency of conveyor ovens depends, in part, upon the uniform application of heat across the food product passing therethrough. In addition, it is also necessary to control or regulate the velocity of the heated gases directed onto the surfaces of the food items to be cooked.

For example, in the case of pizza, it is desirable to cook the crust under different conditions than the topping and, therefore, the heated air currents directed at the bottom of the pizza are much stronger than those directed at the top. In addition, in the case of pizza, it is necessary to melt the cheese on the upper surface under conditions which will not result in disturbing or blowing the topping particles off of the pizza pie. Therefore, separate controls for the heated air currents directed onto the upper and lower surfaces of the food items to be cooked are necessary.

It is also known that it is desirable to avoid the continuous application of heated air currents to the surface of the food items to be cooked as they pass through the entire length of the cooking chamber. If the heated air currents are applied with lesser and then greater intensity, moisture will percolate to the surface as the food item passes through the area of lesser intensity so that it can be removed in the section of greater intensity. In this way, the product will cook through and the formation of a crust on the surface with a cold interior will be avoided.

Finally, it is desired to achieve the foregoing in a relatively compact and uncomplicated structure minimizing the controls necessary to achieve the desired cooking results whereby the device may be suitable for smaller commercial establishments and for operation by relatively unskilled personnel.

DESCRIPTION OF THE PRIOR ART

In order to achieve a relative uniform flow across the conveyor laterally onto the food product as it passes through a conveyor oven, it was proposed, for example, in U.S. Pat. Nos. 4,154,861, and in particular in related U.S. Pat. No. 4,462,383 to provide individual finger ducts which extend laterally across the cooking chamber both above and below the conveyor. The ducts have nozzles on the sides adjacent the conveyor, which nozzles in turn dispense columnated jets onto the food product to be cooked. The jets were intended to diffuse only after encountering the food product and by being spaced apart to accomplish a sweeping action across the food product, removing moisture from the surface thereof. As the product then passed through an area between such ducts, the moisture could return to the surface of the product for subsequent removal as the food product continued and passed under the jets in the next, adjacent duct.

In order to provide a uniform flow through the nozzles extending laterally along each individual duct, the ducts were tapered so that the internal cross section continually diminished in the direction of flow, away from the flow inlet at an end of each duct. In addition, each duct was provided with a deflector plate adjacent the entrance thereto. The deflector plate described is mounted to be angled upwardly into the incoming flow. The lower half of the plate is secured by mounting flanges on either side and the upper half is apparently freely moveable. The combination then of the tapered duct and the deflector plate is described as providing a uniform flow of heated gas through the individual nozzles along the length of each duct so that columnated jets directed downwardly or upwardly onto the surface of the food product to cook in a uniform manner. It is described that the deflector is disposed about one-third of the distance from the air inlet to the duct and the tapered, distal end so that air entering the duct will be partially deflected into the jets located in that first third. It is further described that in the absence of a deflector plate, the heated gases would enter the duct at such a velocity that they would collect at the opposite end thereof exiting primarily at the jets located at such end. There is no explanation provided to explain why the lower portion of the deflector plate is stationery and the upper portion moveable.

As noted above, each upper and lower duct has a flat, rectangular surface adjacent the conveyor upon which the nozzles are provided. This surface is referred to as a jet plate. The ducts are then formed by triangular sides and a top portion that tapers from a maximum cross section adjacent the heated gas inlet to a minimum cross section at the opposite end thereof. The jet plates mounting the nozzles then are disposed parallel and perpendicular to the plane containing the conveyor and the tapering of the ducts to restrict the cross section in the direction away from the inlet is achieved by the sides and top portion. The tapered ducts also provide for a gas return around the upper or lower portion thereof to the impeller. After heated gases impinge upon the surface of the conveyor and food products to be cooked, the gases diffuse between the ducts into air returns occupying the areas above or below the tapered portion of the ducts whereby the gases are returned to the impeller for heating and recirculation.

This type of conveyor is also utilized in non-food technologies such as web treatment. U.S. Pat. No. 4,776,107 relates to an apparatus for treating a moving web with heated air or the like provided by ducts which extend over the upper surface of such web. While a chamber is provided somewhat similar to a conveyor oven, the web passing therethrough is heat treated on the upper surface only. Individual duct members extend perpendicular and parallel to the plane containing the web as it moves through the chamber and heated gas is dispensed from the ducts onto the upper surface of the web. In order to ensure that the gas dispensed is at a constant velocity through ports which extend across each duct, a pair of baffle members are provided within each duct. The heated gas enters each duct longitudinally at one end thereof and initially encounters an eddy-creating baffle which is a plate angled at about 15 degrees to the horizontal wherein the leading edge is downstream from the trailing edge distal to the inlet. Downstream of the eddy-creating baffle is a stabilizer baffle which is a flat plate disposed coaxially with the duct member. The patent describes that the combination of these two baffle plates regulate the flow through a series of downwardly directed openings in the duct member so that the velocity therethrough is constant along the length of the duct.

SUMMARY OF THE INVENTION

It has been discovered, however, that an efficient compact conveyor oven can be provided wherein an internal duct system generates a flow of heated air within the cooking chamber through a plurality of ducts disposed above and below the conveyor. The ducts each have internal means for regulating the velocity therethrough so that the flow is uniform along the length of each duct whether downwardly or upwardly directed onto the food item to be cooked. In addition, the requirement for tapered ducts is eliminated so that a more compact structure is provided by eliminating one of the two conventional air return chambers. In addition, the flow through the lower duct members enters at the top of each duct and makes an internal 90 degree turn as it passes therethrough which turn is guided by a first baffle plate into a second stabilizing plate spaced within the duct and downstream of the first plate. The first baffle plate is also angled to facilitate this 90 degree turn as it is located in the inlet port and angled downwardly downstream thereof. The result is a much more uniform flow exiting through a plurality of exit ports or holes which extend the length of the duct perpendicular to the conveyor.

In a preferred embodiment, five mutually spaced duct members extend along the bottom side of the conveyor directing a flow of heated air upwardly onto the lower surface, and two duct members of extended width are provided directing air downwardly onto the upper surface. The air returned then from the cooking chamber is drawn below the bottom ducts around a heat tube, and into an impeller which directs the heated air into a single plenum chamber which in turn feeds both the upper and lower ducts. In this version then, a relatively small oven can be provided for small commercial establishments which will do a dependable and efficient job cooking a variety of food products including fast food items.

Accordingly, it is an object of this invention to provide an efficient conveyor oven which is compact in size and can be reliably depended upon to cook a variety of food items.

It is yet another object to provide a compact conveyor oven wherein heated gas under pressure is dispensed onto the upper and lower surfaces of food to be cooked through a plurality of mutually spaced ducts each of which extends perpendicular to the direction of travel of the conveyor and contains a plurality of heated gas dispensing ports on the surface adjacent the conveyor.

It is yet another object of this invention to provide a duct for dispensing heated gas under pressure wherein the heated gas is dispensed at a uniform velocity through holes or through ports extending the length of the duct wherein the flow of heated gas enters the duct at one end and proceeds through the duct around a first angled baffle plate and subsequently around a second baffle plate spaced horizontally between the upper and lower portions of the duct whereby the combination of such structural elements results in a constant velocity flow through the ports extending the length of said duct.

These and other objects will become readily apparent with reference to the drawings and following description wherein:

DETAILED DESCRIPTION OF THE INVENTION

Figure 1:
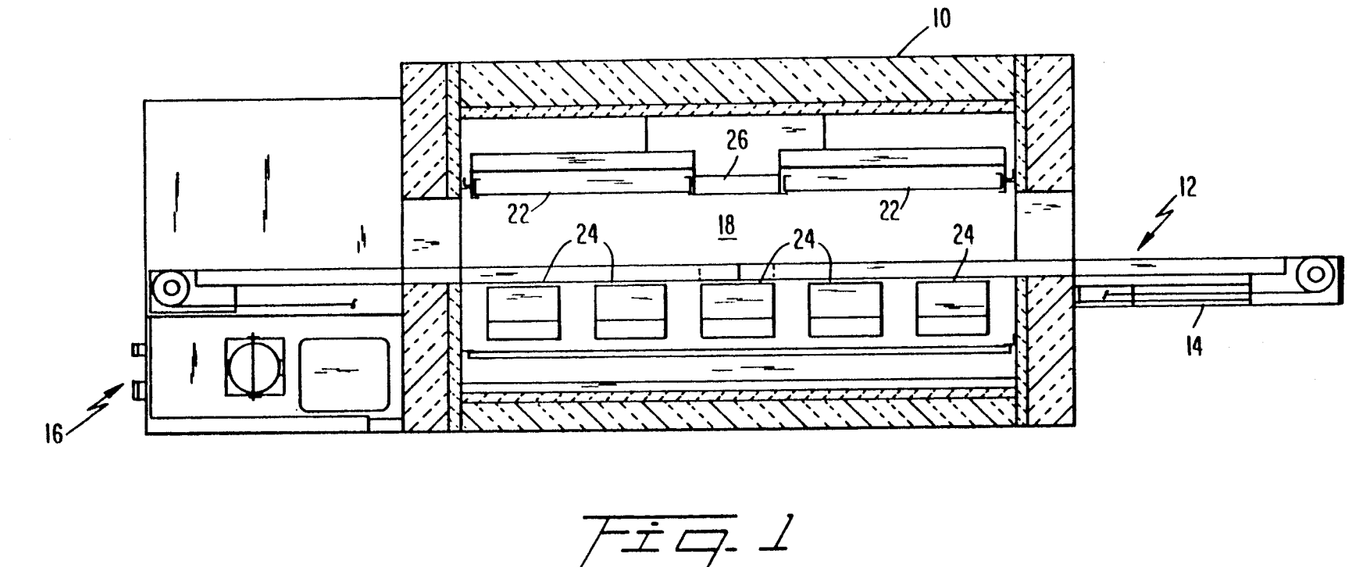
FIG. 1 is a side view of the oven of this invention in partial section.
Figure 2:
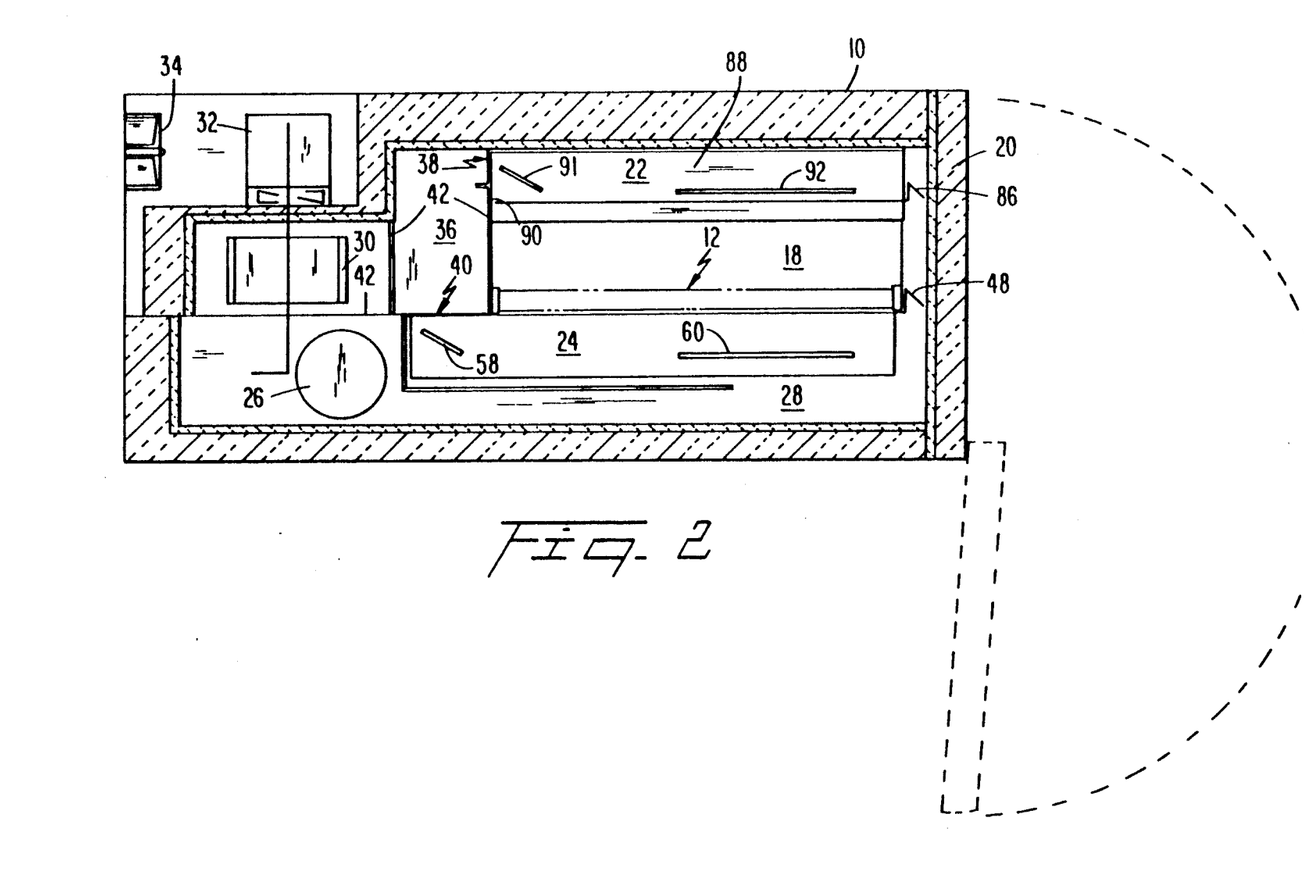
FIG. 2 is an end view in partial section of the oven of FIG. 1.
Figure 3:
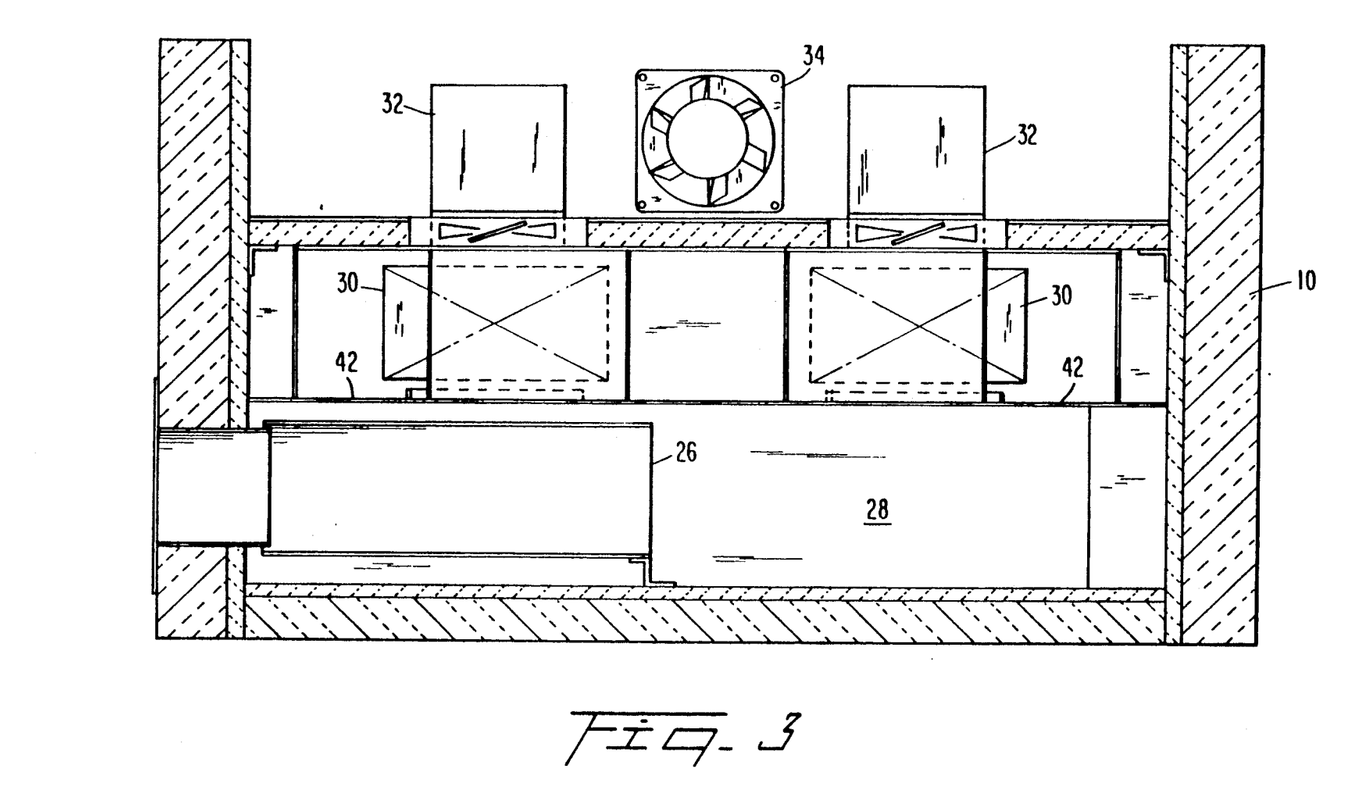
FIG. 3 is a cross-sectional view taken through the heating section of the device of this invention.

With attention to the drawings and FIGS. 1-3 in particular, the oven of this invention consists of an insulated cabinet 10 which mounts a conventional conveyor 12 and which may include tensioning devices 14 as desired. Controls 16 are provided which are also conventional and regulate, for example, the heat and speed of the conveyor belt.

Cabinet 10 forms a cooking chamber 18 which in the embodiment of this invention is a little less than two feet wide and about 3 feet long. FIG. 1 is a longitudinal section as noted above showing the length of the cooking chamber 18 whereas the width is shown in FIG. 2. As shown in FIG. 2, the cabinet 10 may have a removable front door 20 for access to the interior of the cooking chamber as desired. Door 20 is shown to be hinged in FIG. 2.

Heat to the interior of chamber 18 is provided by two upper nozzles 22 and five lower nozzles 24. Lower nozzles 24 are mutually spaced along the length of the chamber 18 whereas upper nozzles 22 are separated by a center plate 26. Under the dimensions of the preferred embodiment, the upper nozzles 22 are about 12 inches wide and the lower nozzles 24 are about 4 inches wide. The interior dimensions of the cooking chamber 18 then are about 30 inches by 22 inches by 3½ inches high above the conveyor 12. The device of this invention then is quite compact. However, as will be obvious to those skilled in the art, the device of this invention may be scaled-up as desired.

With reference to FIGS. 2 and 3, the source of heat in the oven is a flame tube 26. Heated air within the cabinet returns below lower nozzles 24 in an air return 28 to be reheated by flame tube 26. In the embodiment of this invention, twin blowers 30 are provided which are operated by motors 32 and cooled by a conventional cooling fan 34. Heated air from the surrounding of flame tube 26 travels upwardly axially into blowers 30 and is expelled radially into a plenum chamber 36. As will be subsequently described, air from chamber 36 enters upper nozzles 22 at entrance ports 38 and lower nozzles 24 at entrance ports 40 as will be subsequently explained.

Figure 6:
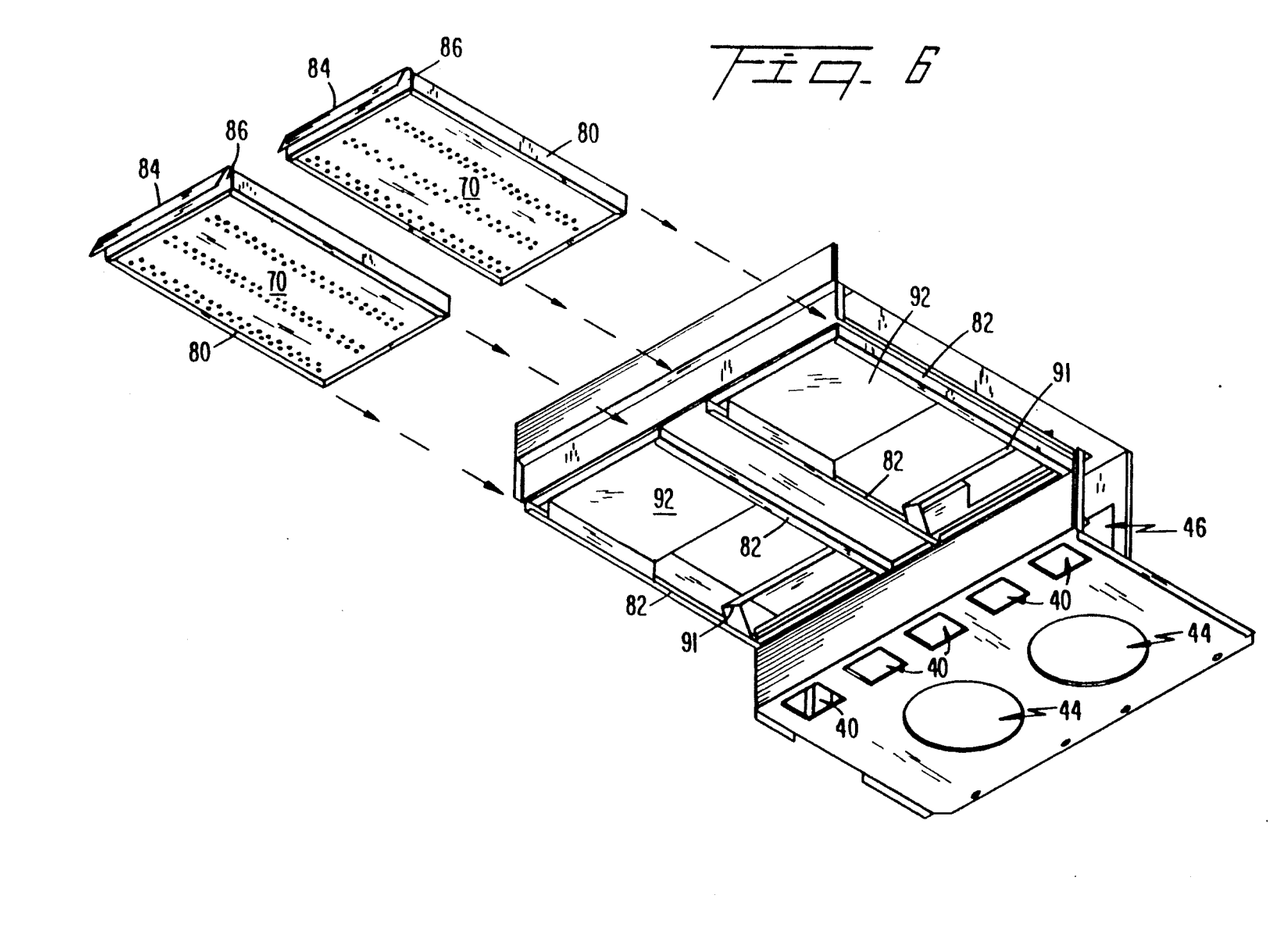
FIG. 6 is an exploded view of the upper ducts and plenum liner in perspective looking up.

With attention to FIG. 6, plenum chamber 36 is surrounded by a liner wall 42 which provides air entrance ports 44 to the blowers 30 and exit ports 46 into the plenum chambers.

Figure 4:
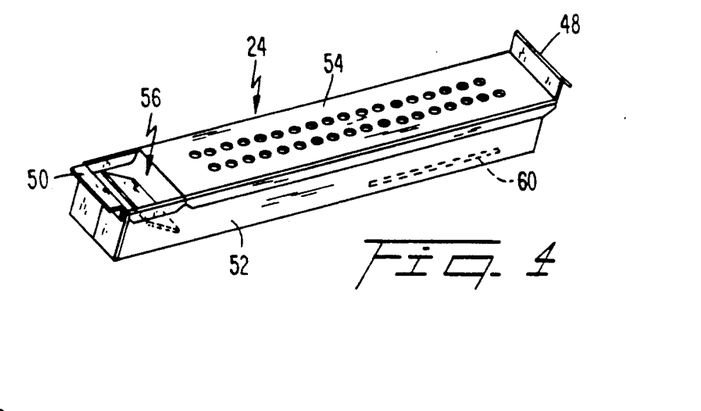
FIG. 4 is a perspective view of a lower duct member.

With attention to FIG. 4, each lower nozzle 24 has end mounting flanges 48 and 50 and an elongated, rectangular in cross section, housing 52 which mounts a foraminous plate 54 on the upper surface thereof. Each nozzle 24 has an entrance port 56 adjacent the foraminous plate 50 and mounted in the entrance port 56 is a diverter plate 58 which is typically disposed at about a 30 degree angle to the longitudinal axis of the nozzle 24. A flow of air downwardly then through entrance port 56 both encounters diverter plate 58 and flows around it. The plate 58 serves primarily to direct a turbulent flow of air into the interior of nozzle 24. The entrance port 56 is typically about 3¼ inches by about 4 inches. Diverter plate 58 is typically about 2 inches long.

Figure 4A:
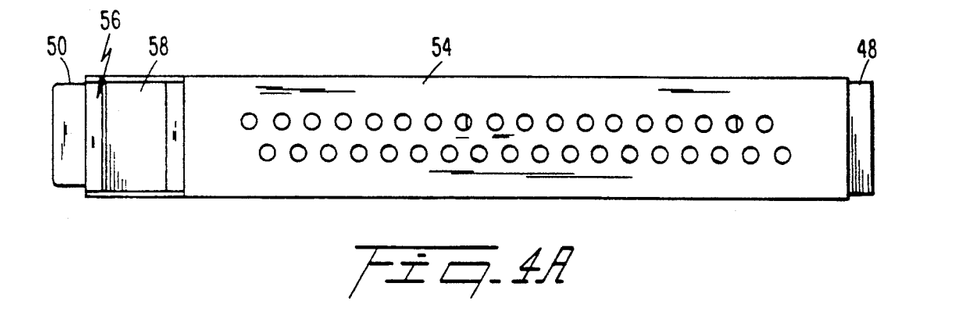
FIG. 4a is a top view of the duct member of FIG. 4.
Figure 4B:
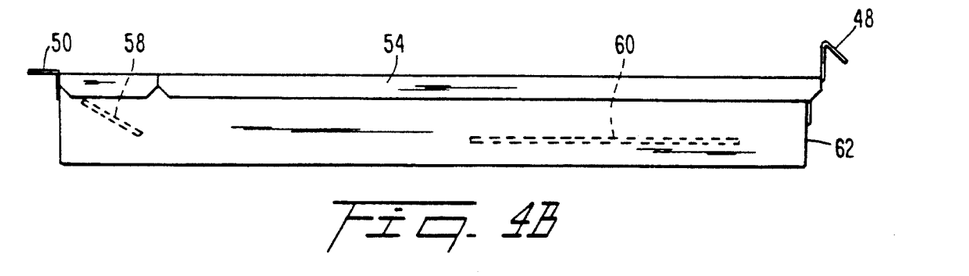
FIG. 4b is a side view of the duct member of FIG. 4.
Figure 4C:
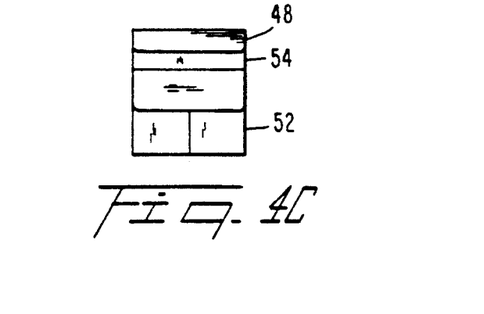
FIG. 4c is an end view of the duct member of FIG. 4.

A second plate, a stabilizer plate 60, is provided within the housing 52, and plate 60 is disposed horizontally, or coaxially with nozzle 24. The plate 60 is typically 10 inches long and terminates about 2 inches from the end 62 of nozzle 24. The flow of air then entering nozzle 24 is stabilized by the flat plate 60 so that the flow exiting through the foraminous plate 54 is at substantially the same velocity through the entire length of plate 54. It has been discovered that the combination of diverter plate 58 and stabilizer plate 60 insures the uniformity of the flow exiting nozzle 24 at a constant velocity throughout the length of the nozzle 24. Both plates 58 and 60 are typically welded at welds 62 to opposite sides of the housing 52. As shown, for example, in FIG. 4a, plate 58 extends between opposed walls and although not shown, plate 60 likewise extends between opposed walls so that the flow of air entering port 56 goes above and below both plates 58 and 60, but not around the sides.

Figure 5:
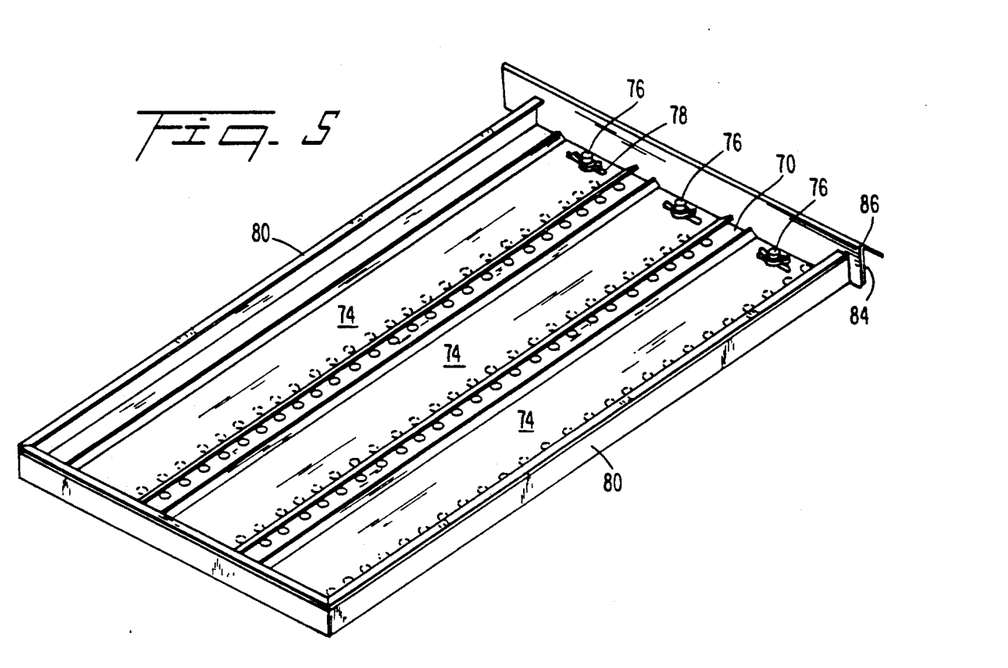
FIG. 5 is a perspective view of the air dispensing lower plate of an upper duct of this invention.
Figure 5A:
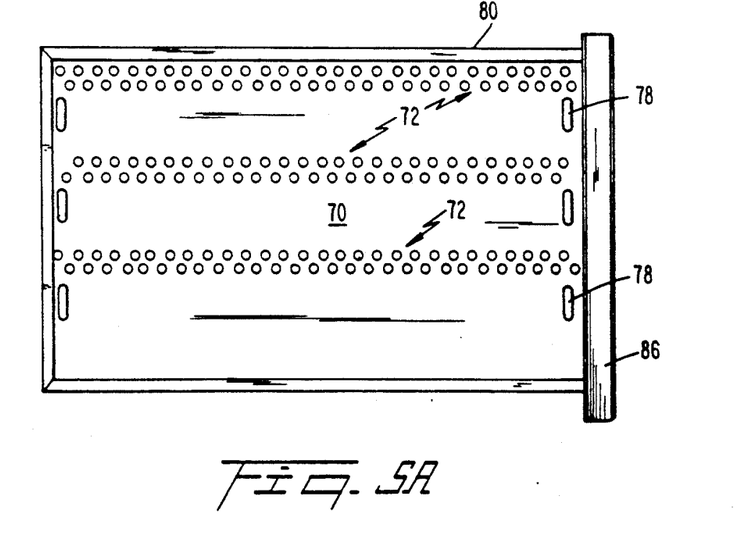
FIG. 5a is a bottom view of the air plate of FIG. 5.

With attention to FIG. 5 and 6, each upper nozzle 22 consists of a foraminous plate 70 having a plurality of spaced pairs of holes 72 therein. The upper surface of plate 70 mounts three masking plates 74. Typically, the plates 74 are mounted by thumbscrews 76 set in slots 78 so that each plate 74 can be mounted either over one or both rows of holes 72 or over neither as desired to govern the flow of heated air therethrough.

Plates 70 are track mounted on tracks 80 which are received in tracks 82 which are mounted within cabinet 10 extending outwardly from ports 38. Handles 84 are provided on a rear wall 86 so that the trays may be removed for cleaning.

An upper wall 88 serves with the tracks 82 and end wall 90, which defines port 38, to form with the foraminous plate 70 each upper nozzle 22. Disposed within each nozzle 22 adjacent the entrance port 38 is a diverter plate 91 disposed at about a 30 degree angle to the horizontal. Downstream of diverter plate 91 is a stabilizer plate 92. Diverter plate 91 typically is about two inches long and stabilizer plate 92 typically is about 10 inches long, the same dimensions as the corresponding structural features 58 and 60 in nozzles 24. Air then enters port 38 and encounters diverter plate 90 which directs some air downwardly and some air passes thereover. Upon encountering stabilizer plate 92, the flow of air both stabilizes and flows around it so that the stream of air exiting the foraminous plate 70 through holes 72 downwardly onto the food product is at substantially the same velocity throughout the length of nozzle 22. Therefore, diverter plates 91 and 92 function as diverter plates 58 and 60 to regulate the flow of air outwardly through the holes onto the food product passing through the cooking chamber 18 on the conveyor 12. As will be obvious to those skilled in the art, the flow of air can be regulated, in the case of nozzles 22, by use of masking plates 74. As will also be obvious to those skilled in the art, one or more lower nozzles 24 could be removed and the corresponding port 40 covered if it is desired to alter the air flow onto the bottom portion of the food to be cooked. Typically, however, the intensity of the heat directed onto the upper portion of the food to be cooked will be more critical in that toppings, cheese, and the like, will be cooked more slowly than the underlying crust.

In the preferred embodiment of this invention, the holes 72 in upper plate 70 are ⅜ inch in diameter and disposed on ⅞ inch centers. Typically, the rows of holes are 3¾ inches apart. Similar dimensions are applicable to the holes provided in plate 54 of lower nozzles 24.

In summary then, a compact and efficient conveyor oven is provided using spaced apart sets of nozzles which extend across the path of travel of the conveyor but are spaced apart along the length of the cooking chamber. Each nozzle is an individual duct housing which has a foraminous plate on the side adjacent the conveyor for dispensing heated air through the holes therein and an entrance port at one end thereof. In the case of the upper nozzles, only two are provided and these in fact provide three sets of holes which may be masked if desired. Heated air from a plenum enters each upper nozzle essentially along the longitudinal axis, and heated air from the same plenum enters each lower nozzle at a port essentially perpendicular to the longitudinal axis. The interior of the nozzles, however, have angled diverter plates adjacent the entrance which plates are disposed substantially at a 30 degree angle to the longitudinal axis for initially encountering the entering flow of heated air. Downstream thereof is provided a stabilizer plate which is essentially horizontal or coaxial with the longitudinal axis which extends a substantial portion of the length of the nozzle but terminates about two inches from the end thereof. The stabilizer plate is spaced away from the foraminous plate which dispenses the heated air onto the conveyor so that the flow of air must travel around the stabilizer plate. It has been found, however, that the use of these two stabilizer plates will guarantee a substantially identical flow of heated air through the nozzles along the entire length thereof across the path of travel of food traveling through a conveyor.

Furthermore, air from the nozzles collects below the lower nozzles in an air return. The upwardly directed heated currents from the lower nozzles is reflected from the upper portion of the cooking chamber downwardly and the downwardly directed flow of heated air currents also are passed around the lower nozzles and into the air return. A flame tube is provided adjacent the air return which reheats the air and the reheated air is then sucked by blowers out of the blower portion of the oven and directed into a plenum chamber which feeds both the upper and lower nozzles with heated air under pressure.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

We claim:

1. A conveyor oven comprising:

a housing defining a heating chamber having an inlet and an outlet opening; a conveyor mounted on said housing and establishing a path of travel extending through the inlet, heating chamber and outlet for transporting food therethrough;

a plurality of mutually spaced ducts extending across the path of travel of said conveyor through said chamber perpendicular thereto and disposed above and below said conveyor, each duct having a side adjacent the conveyor defined by a foraminous plate having holes extending the length of that portion of said duct which extends across the path of travel of said conveyor and each duct having an inlet at a common end;

plenum chamber means disposed within said housing in communication with the inlet to each duct for directing heated air under pressure there into the ducts disposed above the conveyor admitting air from the plenum in an axial flow longitudinally; and the inlets to the ducts disposed below the conveyor admitting air form the plenum in a flow perpendicular to the longitudinal axis of the ducts;

regulating means including a pair of baffle plates disposed within each duct for directing a flow of heated air from the inlet through the holes in each foraminous plate and onto the conveyor at substantially the same velocity across the path of travel thereof;

air return chamber disposed below said conveyor for capturing air dispensed from said ducts onto said conveyor and heat means and blower means in communication with said chamber for reheating said air and recirculating the same to said plenum chamber means.

2. The oven of claim 1 wherein said regulating means includes a diverter plate disposed adjacent the inlet to each duct and disposed at an acute angle to the longitudinal axis of the duct and opening upwardly into the incoming flow.

3. The oven of claim 2 wherein the regulator means further comprising a stabilizer plate downstream of said diverter plate, said plate being parallel to the longitudinal axis of said duct and spaced away from the end opposite the inlet and the foraminous plate .

4. The oven of claim 3 wherein said stabilizer plate is spaced about 2 inches from the end of said duct opposite the inlet.

5. The oven of claim 4 wherein the foraminous plates in the ducts disposed above the conveyor further comprise parallel rows of holes extending across the path of travel of said conveyor and masking means for covering or uncovering at least one of said rows.

6. The oven of claim 5 wherein the spaces between the ducts disposed beneath the conveyor oven into the air return chamber.

7. The oven of claim 6 further comprising reflector plate means disposed in the spaces between the ducts disposed above the conveyor for reflecting air impinging thereon downwardly.

8. The oven of claim 4 wherein said stabilizer is about 10 inches long and said path of travel of said conveyor is at least about 22 inches wide.

9. The oven of claim 2 wherein the angle is about 30 degrees.

10. The oven of claim 9 wherein the lower duct diverter plate is about two inches long and the inlet therein in the upper surface of said ducts is at least about three inches long with said diverter plate being disposed immediately below the inlet.

11. The oven of claim 1 wherein each duct is rectangular in cross section but ducts disposed above the conveyor have a width in the direction of travel of said conveyor of about three times that of the ducts disposed below the conveyor.

12. The oven of claim 11 wherein 2 ducts are provided above the conveyor and five below.

13. The oven of claim 1 wherein said chamber comprises an access opening and door therefor and the foraminous plates in said upper ducts are slidably mounted therein for removal through said access opening.

14. The oven of claim 13 wherein said lower ducts are slidably mounted therein for removal through said access opening for cleaning or replacement.

* * * * *